United States Patent
McLane et al.

(10) Patent No.: US 7,796,529 B2
(45) Date of Patent: Sep. 14, 2010

(54) LINK ANALYSIS METHOD AND SYSTEM

(75) Inventors: Brian R. McLane, New York, NY (US); Jesse Chenard, Norwalk, CT (US); Nicole McLane, New York, NY (US)

(73) Assignee: Streamaware, LLC, NY, NY (US)

(*) Notice: Subject to any disclaimer, the term of this patent is extended or adjusted under 35 U.S.C. 154(b) by 750 days.

(21) Appl. No.: 11/206,370

(22) Filed: Aug. 18, 2005

(65) Prior Publication Data
US 2006/0083165 A1 Apr. 20, 2006

Related U.S. Application Data

(60) Provisional application No. 60/604,915, filed on Aug. 28, 2004.

(51) Int. Cl.
*H04J 1/16* (2006.01)

(52) U.S. Cl. ...................... 370/248; 370/253

(58) Field of Classification Search .............. 370/229, 370/230, 230.1, 231–235, 241, 237, 238, 370/252, 253, 254, 248; 702/57, 79, 124
See application file for complete search history.

(56) References Cited

U.S. PATENT DOCUMENTS

| | | | | |
|---|---|---|---|---|
| 5,095,444 A | | 3/1992 | Motles | 364/514 |
| 6,047,323 A | * | 4/2000 | Krause | 709/227 |
| 6,606,303 B1 | | 8/2003 | Hassel et al. | 370/238 |
| 6,813,580 B2 | * | 11/2004 | Florschuetz | 702/124 |
| 7,158,479 B1 | * | 1/2007 | Noble | 370/229 |
| 2001/0056416 A1 | * | 12/2001 | Garcia-Luna-Aceves | 707/2 |
| 2002/0198985 A1 | * | 12/2002 | Fraenkel et al. | 709/224 |

* cited by examiner

*Primary Examiner*—Kwang B Yao
*Assistant Examiner*—Andrew Lai
(74) *Attorney, Agent, or Firm*—Hoffberg & Associates

(57) ABSTRACT

A method and computer program product for performing a latency analysis to determine one or more latency statistics for one or more network links within a distributed computing network. The one or more latency statistics are compared to one or more benchmark latency criteria to determine if at least one of the network links is a latency-compatible network link. If at least one of the network links is a latency-compatible network link, at least one additional network analysis is performed on at least one of the latency-compatible network links.

26 Claims, 4 Drawing Sheets

LINK ANALYSIS METHOD AND SYSTEM

RELATED APPLICATIONS

This application claims the priority of the following application, which is herein incorporated by reference: U.S. Provisional Application Ser. No.: 60/604,915, filed 28 Aug. 2004, entitled, "STREAMAWARE".

TECHNICAL FIELD

This disclosure relates to network link analysis and, more particularly, to automated network link analysis.

BACKGROUND

CDNs (i.e., Content Delivery Networks) allow for the electronic distribution of media content (that is provided by content providers) to users over distributed computing networks, such as the internet. Example of the types of media content distributed include advertisements, sporting events, news broadcasts, music videos, and corporate presentations, for example.

A CDN typically includes a network of servers that deliver the media content from e.g., a customer website/broadcast event to a user based upon, among other things, the geographic location of the user and the origin of the website/event. Typically, a CDN caches the content from the customer's website/event to the CDN's network of servers, which are geographically dispersed. Accordingly, when a user requests the media content, the CDN will redirect the request to a server within the CDN that is geographically closest to the user. The cached content is then delivered to the user.

In order for a content provider to effectively utilize the services of a CDN, the network link through which the content is broadcast to the CDN must be sufficiently fast and reliable.

SUMMARY OF THE DISCLOSURE

In one implementation, a method includes performing a latency analysis to determine one or more latency statistics for one or more network links within a distributed computing network. The one or more latency statistics are compared to one or more benchmark latency criteria to determine if at least one of the network links is a latency-compatible network link. If at least one of the network links is a latency-compatible network link, at least one additional network analysis is performed on at least one of the latency-compatible network links.

One or more of the following features may also be included. At least one of the one or more latency statistics may be stored on a remote data store accessible via the distributed computing network. Performing at least one additional network analysis may include performing a data transfer rate analysis to determine a link data transfer rate for at least a portion of at least one of the latency-compatible network links. Performing a data transfer rate analysis may include downloading a test data file from a server device coupled to the distributed computing network.

The link data transfer rate may be compared to a benchmark data transfer rate to determine if the at least a portion of at least one of the latency-compatible network links has an acceptable data transfer rate. The link data transfer rate may be stored on a remote data store accessible via the distributed computing network.

Performing at least one additional network analysis may include performing a port connectivity analysis to determine one or more port availability statistics for one or more data ports within a server device coupled to at least one of the latency-compatible network links. At least one of the one or more port availability statistics may be stored on a remote data store accessible via the distributed computing network.

If at least one of the network links is a latency-incompatible network link, a network route analysis may be performed to analyze one or more discrete portions of at least one of the latency-incompatible network links. The one or more benchmark latency criteria may include a maximum allowable latency rate. The latency-incompatible network link may be a network link in which at least one of the one or more latency statistics exceeds the maximum allowable latency rate.

A report may be generated that includes one or more of: the one or more latency statistics; a link data transfer rate for at least a portion of at least one of the latency-compatible network links; and one or more port availability statistics for one or more data ports within a server device coupled to at least one of the latency-compatible network links.

A report may be generated that defines one or more streaming-compatible network links. The one or more streaming-compatible network links may be chosen from the one or more network links within the distributed computing network. The report may include one or more of: the one or more latency statistics; a link data transfer rate for at least a portion of at least one of the latency-compatible network links; and one or more port availability statistics for one or more data ports within a server device coupled to at least one of the latency-compatible network links.

In another implementation, a computer program product resides on a computer readable medium having a plurality of instructions stored thereon. When executed by a processor, the instructions cause the processor to perform a latency analysis to determine one or more latency statistics for one or more network links within a distributed computing network. The one or more latency statistics are compared to one or more benchmark latency criteria to determine if at least one of the network links is a latency-compatible network link. If at least one of the network links is a latency-compatible network link, at least one additional network analysis is performed on at least one of the latency-compatible network links.

One or more of the following features may also be included. At least one of the one or more latency statistics may be stored on a remote data store accessible via the distributed computing network. Performing at least one additional network analysis may include performing a data transfer rate analysis to determine a link data transfer rate for at least a portion of at least one of the latency-compatible network links. Performing a data transfer rate analysis may include downloading a test data file from a server device coupled to the distributed computing network.

The link data transfer rate may be compared to a benchmark data transfer rate to determine if the at least a portion of at least one of the latency-compatible network links has an acceptable data transfer rate. The link data transfer rate may be stored on a remote data store accessible via the distributed computing network.

Performing at least one additional network analysis may include performing a port connectivity analysis to determine one or more port availability statistics for one or more data ports within a server device coupled to at least one of the latency-compatible network links. At least one of the one or more port availability statistics may be stored on a remote data store accessible via the distributed computing network.

If at least one of the network links is a latency-incompatible network link, a network route analysis may be performed to analyze one or more discrete portions of at least one of the latency-incompatible network links. The one or more benchmark latency criteria may include a maximum allowable latency rate. The latency-incompatible network link may be a network link in which at least one of the one or more latency statistics exceeds the maximum allowable latency rate.

A report may be generated that includes one or more of: the one or more latency statistics; a link data transfer rate for at least a portion of at least one of the latency-compatible network links; and one or more port availability statistics for one or more data ports within a server device coupled to at least one of the latency-compatible network links.

A report may be generated that defines one or more streaming-compatible network links. The one or more streaming-compatible network links may be chosen from the one or more network links within the distributed computing network. The report may include one or more of: the one or more latency statistics; a link data transfer rate for at least a portion of at least one of the latency-compatible network links; and one or more port availability statistics for one or more data ports within a server device coupled to at least one of the latency-compatible network links.

The details of one or more implementations is set forth in the accompanying drawings and the description below. Other features and advantages will become apparent from the description, the drawings, and the claims.

DETAILED DESCRIPTION OF THE PREFERRED EMBODIMENTS

Figure 1:
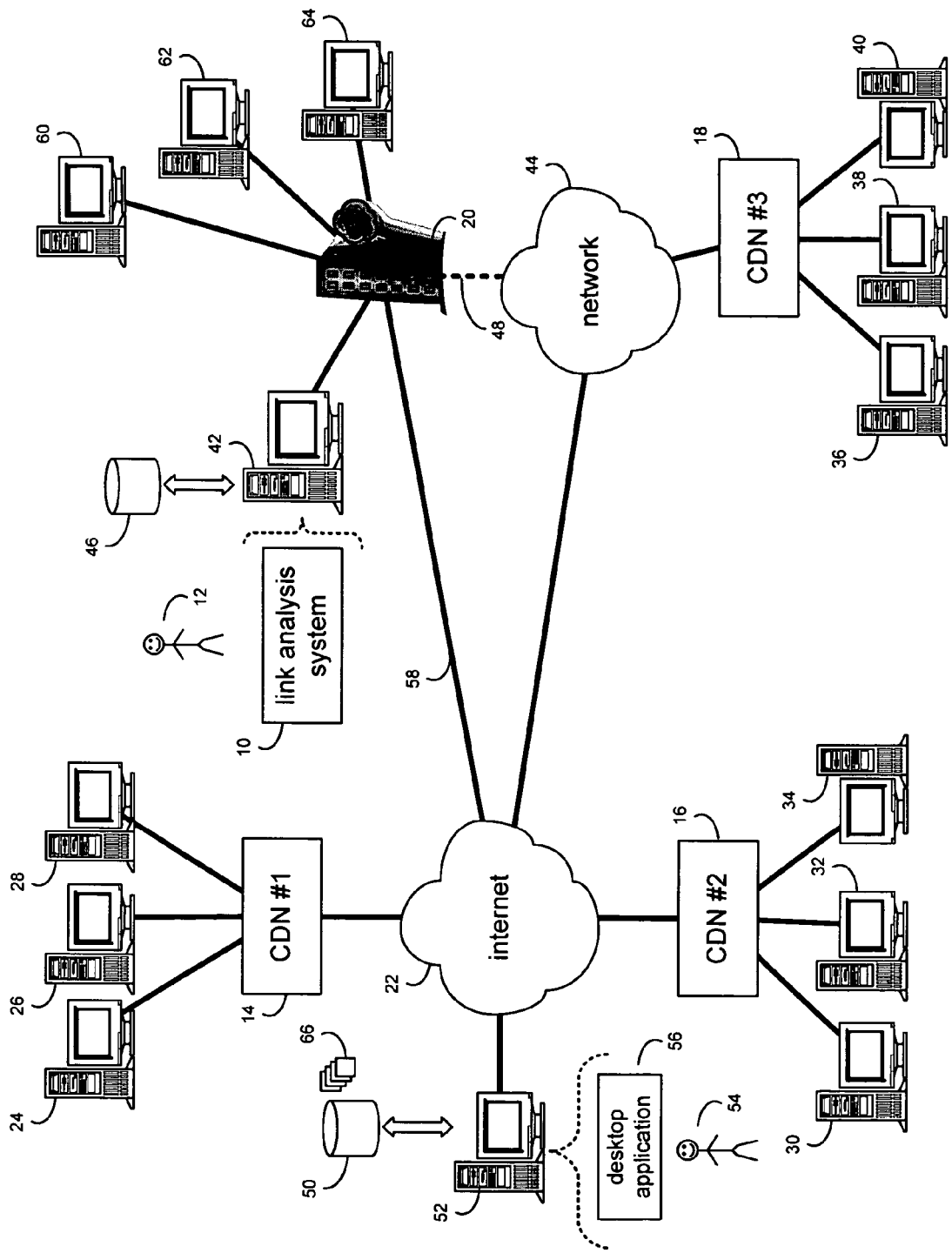
FIG. 1 is a diagrammatic view of a link analysis system coupled to a distributed computing network.

Referring to FIG. 1, there is shown a link analysis system 10 that allows user 12 to verify the integrity and sufficiency of network links between one or more CDNs 14, 16, 18 and the site 20 from which link analysis system 10 is being executed. As discussed above, CDNs deliver media content to users via a distributed computing network 22, an example of which is the internet. CDNs typically include a plurality of geographically-dispersed servers (or banks of servers) for providing the media content to the users. For example, CDN 14 is shown to include servers 24, 26, 28; CDN 16 is shown to include servers 30, 32, 34; and CDN 18 is shown to include servers 36, 38, 40. While CDNs 14, 16, 18 are each shown to include three servers (or banks of servers), this is for illustrative purposes only, as the actual number of servers (or banks of servers) may be increased or decreased dependent upon need and bandwidth requirements.

Link analysis system 10 typically resides on and is executed by a computer 42 that is connected (directly or indirectly) to network 22. Computer 24 may be a laptop or notebook computer executing an operating system (e.g., Microsoft Windows™). Link analysis system 10 may be an application executed on computer 42 and implemented as e.g., an Active X™ control, a Java™ Applet, and/or a WIN32™ executable, for example. Network 22 may be connected to one or more secondary networks (e.g., network 44), such as: local area networks; wide area networks; or intranets, for example. As discussed above, link analysis system 10 may be directly coupled to network 22, or indirectly coupled to network 22 through secondary network 44, utilizing link 48 (shown in phantom).

The instruction sets and subroutines of link analysis system 10, which are typically stored on a storage device 46 coupled to computer 42, are executed by one or more processors (not shown) and one or more memory architectures (not shown) incorporated into computer 42. Storage device 46 may be, for example, a hard disk drive, a tape drive, an optical drive, a RAID array, a random access memory (RAM), or a read-only memory (ROM).

As will be discussed below, a remote data store 50 may be accessible (via network(s) 22, 44) by link analysis system 10. An example of data store 50 is a database (e.g., an Oracle™ database, an IBM DB2™ database, a Sybase™ database, a Computer Associates™ database or a Microsoft Access™ database). Data store 50 may be served by a server computer 52 coupled to network(s) 22, 44. Server computer 52 may be a web server running a network operating system, such as Microsoft Window 2000 Server™, Novell Netware™, or Redhat Linux™ Typically, server computer 52 also executes a web server application, such as Microsoft IIS™, Novell Webserver™, or Apache Webserver™, that allows for access to data store 50 via network(s) 22, 44.

An administrator 54 typically accesses and administers data store 50 and server computer 52 through a desktop application 56 (e.g., Microsoft Internet Explorer™, Netscape Navigator™, or a specialized interface) running on server computer 52.

When utilizing link analysis system 10 to analyze network links for use with one or more content deliver systems (e.g., CDNs 14, 16, 18), computer 42 (which executes link analysis system 10) is typically physically taken to the site 20 that is going to be the broadcast point for the media content provided to the CDNs (for subsequent broadcast to one or more users; not shown). Examples of site 20 include e.g., hotels, motels, conference centers, concert halls, and political events, for example. Site 20 may be coupled to network 22 via network link 58. Additionally/alternatively, site 20 may be coupled to network 44 via network link 48 (shown in phantom). Network links 44, 58 may be wired links (e.g., ISDN, cable modem, T1 or T3, for example) or wireless links (e.g., 802.11a, 802.11b, or 802.11g, for example).

Site 20 typically includes one or more devices 60, 62, 64 for streaming the media content to the various servers of the CDNs. For example, devices 60, 62, 64 may include e.g., computers, digital cameras, voice recorders, video recorders, microphones, web cameras, and/or television cameras (for example), that are coupled to network 22 (or network 44) via site 20. A switch (not shown) that is coupled to network 22 (or network 44) may be used to interconnect devices 60, 62, 64 and network 22 (or network 44). Depending on the type of media content streamed, devices 60, 62, 64 may be coupled to audio equipment (i.e., if audio media content is being streamed to a CDN), video equipment (i.e., if video media content is being streamed to a CDN), and/or audio/video equipment (i.e., if audio/video media content is being streamed to a CDN), for example.

As discussed above, in order for a content provider to effectively utilize the services of a CDN, the network link through which the content is broadcast to the CDN must be sufficiently fast and reliable. Typically, the condition of each network link is analyzed prior to the media content distribution event (e.g., the tradeshow, the political event, the concert, or the corporate meeting, for example).

Accordingly, typically prior to the media content distribution event, user 12 visits the site (e.g., site 20) from which the event is being broadcast and couples computer 42 to e.g., the network port (or ports) within site 20 that are going to be used by e.g., devices 60, 62, 64 to broadcast media content to the CDN(s).

Figure 2:
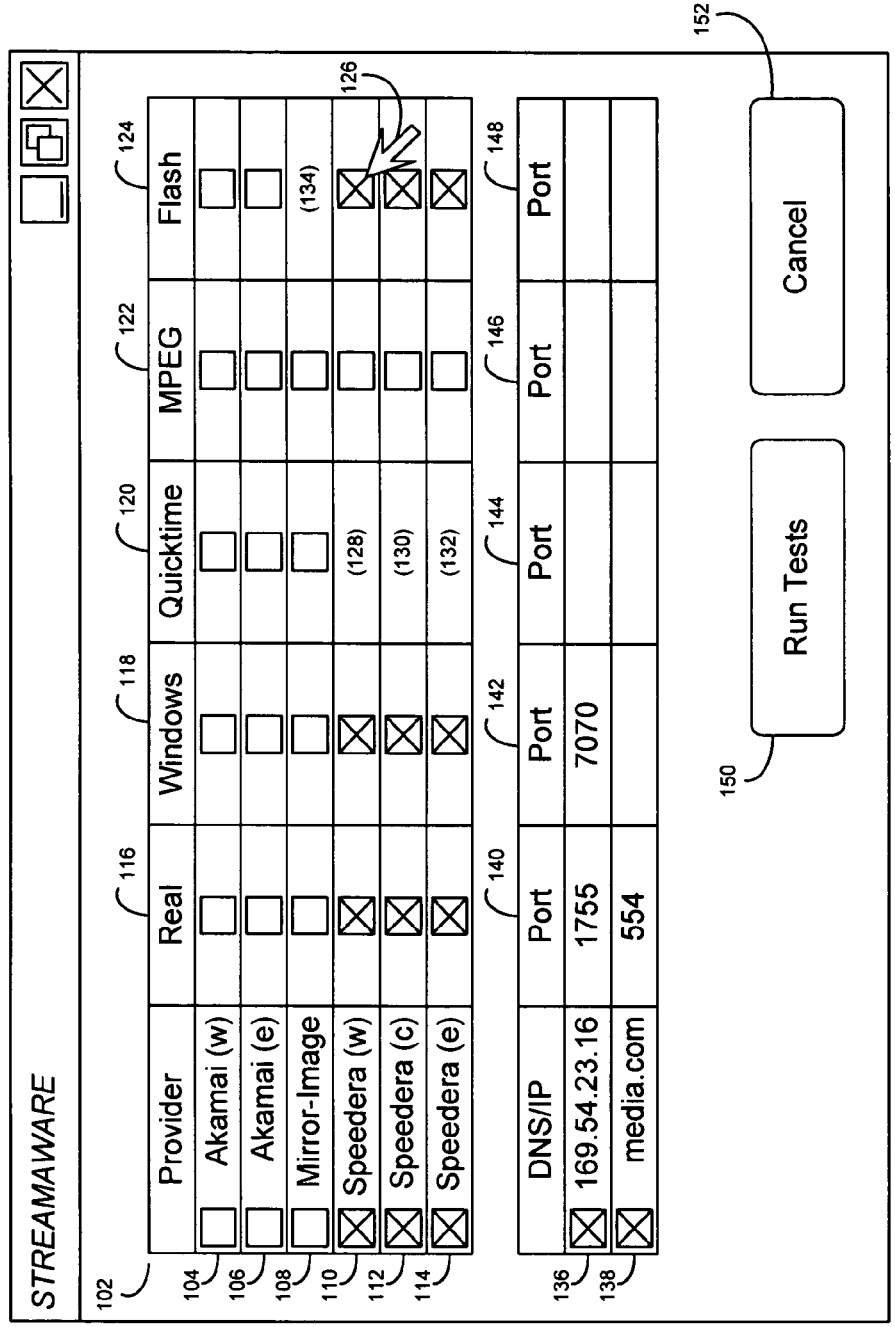
FIG. 2 is a diagrammatic view of a user interface screen rendered by the link analysis system of FIG. 1.

Referring also to FIG. 2, upon executing link analysis system 10, user 12 is typically presented with a user interface screen 100 that is rendered by link analysis system 10.

Though user interface screen 100, user 12 may configure the manner in which link analysis system 10 operates. For example, through user interface screen 100, user 12 may define one or more CDNs for testing. For example, user interface screen 100 may include a table 102 that defines a plurality of predefined CDNs. Table 102 may include a plurality of rows 104, 106, 108, 110, 112, 114, each of which defines a specific server device that is available to receive media content for a CDN. As discussed above, CDNs typically include a plurality of geographically-dispersed servers (or banks of servers) for providing the media content to the users. Accordingly and for illustrative purposes only, CDN "Speedera" may include three geographically-dispersed servers, namely a west coast server (i.e., Speedera (w) 110), a central server (i.e., Speedera (c) 112), and an east coast server (i.e., Speedera (e) 114). Additionally and for illustrative purposes only, CDN "Akamai" is shown to include two geographically-dispersed servers, namely Akamai (w) 104 and Akamai (e) 106; and CDN "Mirror-Image" is shown to include one server, namely Mirror-Image 108.

In addition to listing a plurality of predefined CDNs, table 102 may include a plurality of columns 116, 118, 120, 122, 124 that define the media content types (i.e., formats) uploadable to an individual CDN. Examples of the various types of media content include: Real™ media 116, Windows™ media 118, Quicktime™ media 120, MPEG™ (i.e., Moving Picture Experts Group) media 122, Flash™ media 124, and Java™ media (not shown), for example. Accordingly, user 12 may select the desired media types using a screen pointer 126 that is controllable by a pointing device (e.g., a computer mouse; not shown).

Additionally, one or more CDNs may only be capable of receiving a reduced number of media types. For example and for illustrative purposes only, CDN "Speedera" (i.e., Speedera (w) 110, Speedera (c) 112 and Speedera (e) 114) is shown to offer only four media types, as CDN "Speedera" is shown to not offer Quicktime™ media 120. Accordingly, cells 128, 130, 132 are shown to be blank. Further, as CDN "Mirror-Image" is shown to not offer Flash™ media 124, cell 134 is shown to be blank.

Typically, when a CDN can receive media content in multiple media types, a different server port is accessed for each media type. As is known in the art, a port is a logical server connection and a manner in which a client program may specify a particular server program on a server. Typically, port numbers range from 0 to 65536. For example, Windows™ media typically uses port 80 or port 1755; Real™ media typically uses port 554 or port 7070; Flash™ media typically uses port 80 or port 1935; and Quicktime™ media typically uses port 554.

Additionally and as is known in the art, IP (i.e., internet protocol) addresses are typically used to access devices on a network (e.g., network 22 and network 44, for example). Accordingly, while table 102 is shown to define three servers for CDN "Speedera", namely Speedera (w) 110, Speedera (c) 112 and Speedera (e) 114, this is typically to aid user 12, as the actual definitions would define (in this example) three IP address. For example, server Speedera (w) 110 may have an IP address of 202.160.241.150; server Speedera (c) 112 may have an IP address of 202.160.241.151; and server Speedera (e) 114 may have an IP address of 202.160.241.152. Additionally and as is known in the art, when defining a specific port within a network addressable device, the port number is typically appended to the end of the IP address (being separated from the IP address by a colon). For example, for server Speedera (w) 110 (which in this example has an IP address of 202.160.241.150: IP address 202.160.241.150:1755 may be accessed for Windows™ media; IP address 202.160.241.150:7070 may be accessed for Real™ media; IP address 202.160.241.150:1935 may be accessed for Flash™ media; and IP address 202.160.241.150:554 may be accessed for Quicktime™.

The data (e.g., CDN data and port data, for example) used to generate table 100 may be stored locally (e.g., on storage device 46) or may be retrieved from data store 50 (i.e., which is served by computer 52) when link analysis system 10 is started/executed. This retrieval of data may occur via network 22 and/or network 44.

Additionally/alternatively, user 12 may define one or more servers of a CDN using IP addresses and/or domain names. For example, if a CDN custom configured a server for a specific content delivery event, the relevant IP and port data concerning that custom configured server may not be included within the locally-stored and/or remotely-stored data used to populate table 100. Accordingly, user 12 may define the IP address 136 and/or domain name 138 of a server. Additionally, a plurality of columns 140, 142, 144, 146, 148 may be included that allow user 12 to define one or more port addresses for the specific server, thus enabling various types of media content to be retrieved from the server. As discussed above, once a port address is defined, the port address is typically appended to the end of the IP address. For example, for IP address 169.54.23.16 (i.e., cell 136), the defined addresses would be 169.54.23.16:1755 and 169.54.23.16:7070.

As discussed above, IP addresses are typically used to access devices on a network. Accordingly, if user 12 defines a server by a domain name (e.g., as shown in cell 138), link analysis system 10 may access a DNS server (a Domain Name Server; not shown) so that the domain name (e.g., media.com) may be converted to an IP address. Assuming that the domain name "media.com" corresponds to an IP address of 169.54.27.61, the defined address for port 554 would be 169.54.27.61:554.

Once user 12 defines the CDN(s) to be tested and the media types to be provided to each CDN, link analysis system 10 may analyze the condition of the links between e.g., computer 42 and the various servers that will be used to receive media content. Accordingly, to initiate the testing procedures, user 12 may select the "Run Tests" button 150 using screen pointer 126. Alternatively, user 12 may cancel the testing procedures by selecting the "Cancel" button 152 using screen pointer 126.

Figure 3:
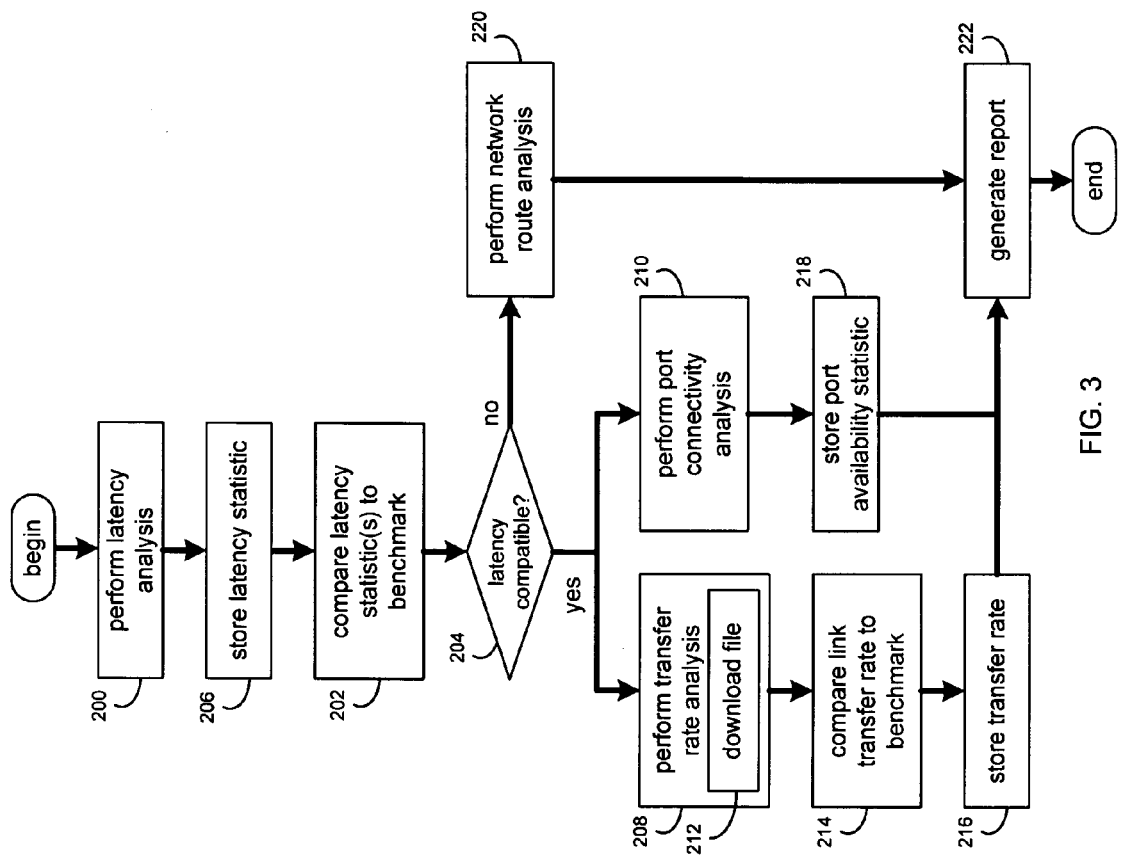
FIG. 3 is a flow chart of a process executed by the link analysis system of FIG. 1.

Referring also to FIG. 3, once the testing procedures are initiated, link analysis system 10 performs 200 a latency analysis for each link defined in user interface screen 100 to determine one or more latency statistics for one or more of the links defined by user 12. As discussed above and shown in FIG. 2, user 12 wishes to test the links between, in this example, computer 42 and: server "Speedera (w)" 110 (i.e.: IP address 202.160.241.150); server "Speedera (c)" 112 (i.e.: IP address 202.160.241.151); server "Speedera (e)" 114 (i.e.:

IP address 202.160.241.152); server "169.54.23.16" 136; and server "media.com" 138 (i.e.: IP address 169.54.27.61).

Typically, when performing 200 the latency analysis, a ping test may be performed to determine the latency statistics of the link being tested. For example, when determining the latency statistic for server "Speedera (w)" 110, IP address 202.160.241.150 may be pinged, resulting in the generation of the following data:

```
Pinging 202.160.241.150 with 32 bytes of data:
Reply from 202.160.241.150: bytes=32 time=70ms TTL=52
Reply from 202.160.241.150: bytes=32 time=69ms TTL=52
Reply from 202.160.241.150: bytes=32 time=66ms TTL=52
Reply from 202.160.241.150: bytes=32 time=68ms TTL=52
Ping statistics for 202.160.241.150:
    Packets: Sent = 4, Received = 4, Lost = 0 (0% loss),
    Approximate round trip times in milli-seconds:
        Minimum = 66ms, Maximum = 70ms, Average = 68ms
```

Accordingly, for server "Speedera (w)" 110, the latency statistics are minimum latency=66 milliseconds; maximum latency=70 milliseconds; and average latency=68 milliseconds. Link analysis system 10 may perform 200 a latency analysis for the link between each server defined in user interface screen 100 and e.g., computer 42, resulting in the generation of the following latency statistics:

| Link | Minimum | Maximum | Average |
|---|---|---|---|
| Speedera (w) | 66 ms | 70 ms | 68 ms |
| Speedera (c) | 125 ms | 135 ms | 130 ms |
| Speedera (e) | 78 ms | 90 ms | 84 ms |
| 169.54.23.16 | 138 ms | 150 ms | 144 ms |
| Media.com | 72 ms | 90 ms | 81 ms |

Once generated, the latency statistics may be compared 202 to one or more benchmark latency criteria to determine if 204 at least one of the network link tested is a latency-compatible network link. Specifically, as the latency rate of a network link increases, the quality of the playback of the media content provided by the CDN is typically compromised. Accordingly, the benchmark latency criteria may define a maximum allowable latency rate for one or more of the "Minimum" latency statistics, "Maximum" latency statistics, and/or "Average" latency statistics. These latency statistics may be stored 206 remotely on data store 50 (FIG. 1) or locally on storage device 46 (FIG. 1).

For illustrative purposes, assume that link analysis system 10 defines a maximum average latency of 100 milliseconds. Accordingly, when comparing 202 the above-described latency statistics to a latency benchmark criteria of 100 milliseconds, the link between server "Speedera (c)" 112 and computer 42 (having an average latency of 130 milliseconds) would fail and be deemed a latency-incompatible network link. Additionally, as the link between server "169.54.23.16" 136 and computer 42 has an average latency of 144 milliseconds, the link would also be deemed a latency-incompatible network link.

However, the links between computer 42 and server "Speedera (w)" 110, server "Speedera (e)" 114, and server "Media.com" 138 (having average latency statistics of 68 milliseconds, 84 milliseconds, and 81 milliseconds, respectively) may all be deemed latency-compatible network links, as the average latency statistic of each link is below the 100 millisecond benchmark.

If 204 a network link is determined to be a latency-compatible network link, at least one additional network analysis may be performed on the link, such as performing 208 a data transfer rate analysis and/or performing a port connectivity analysis 210.

When performing 208 a data transfer rate analysis, a link transfer rate is determined for at least a portion of the latency-compatible network link. Specifically, when performing 208 the data transfer rate analysis, a test data file 66 having a known size (e.g., 1.00 megabytes) may be downloaded 212 and the length of time required to download test data file 66 may be monitored by link analysis system 10. By dividing the size of test data file 66 by the length of time required to download test data file 66, the link transfer rate may be established. For example, if link analysis system 10 determines that it took one minute to download the one megabyte test data file 66, the link transfer rate is (1,000 kilobytes/60 seconds) or 16.67 kilobytes per second.

Test data file 66 may be located on a server other than the CDN server being tested. For example, test data file 66 is shown to be located on computer 52 (which is connected to network 22). Accordingly, in this example, the link transfer rate determined by link analysis system 10 is for the link between e.g., computer 52 and computer 42 and not for the link between server "Speedera (w)" 110 and computer 42. Alternatively, if test data file 66 is located on the server being tested (e.g., server "Speedera (w)" 110), the link transfer rate determined would be for the link between computer 42 and e.g., server "Speedera (w)" 110.

Link analysis system 10 may perform 208 a data transfer rate analysis for each of three above-described latency-compatible links, resulting in the generation of the following link transfer rates:

| Link | Average Latency | Transfer Rate |
|---|---|---|
| Speedera (w) | 68 ms | 16.67 kb/second |
| Speedera (e) | 84 ms | 3.21 kb/second |
| Media.com | 81 ms | 12.58 kb/second |

Once generated, the link transfer rate for each link being tested may be compared 214 to a benchmark data transfer rate to determine if the portion of the latency-compatible network link being tested has an acceptable data transfer rate. Specifically, as the link transfer rate of a network link decreases, the quality of the playback of the media content provided by the CDN may be compromised. Accordingly, the benchmark data transfer rate may define a minimum allowable data transfer rate for the link being tested. These link transfer rates may be stored 216 remotely on data store 50 (FIG. 1) or locally on storage device 46 (FIG. 1).

For illustrative purposes, assume that link analysis system 10 defines a benchmark data transfer rate of 10.00 kilobytes per second. Accordingly, when comparing 214 the above-described link transfer rates to the 10.00 kb/second benchmark transfer rate, the link between server "Speedera (e)" 114 and computer 42 (having a link transfer rate of 3.21 kb/second) would fail and be deemed to have an unacceptable data transfer rate.

However, the links between computer 42 and server "Speedera (w)" 110, and server "Media.com" 138 (having link transfer rates of 16.67 kb/second and 12.58 kb/second, respectively) may all be deemed to have acceptable data transfer rates, as the link transfer rates exceeds the 10.00 kb/second benchmark data transfer rate.

Additionally/alternatively, link analysis system 10 may perform 210 a port connectivity analysis to determine one or more port availability statistics for one or more data, ports within the server that is coupled to at least one of the latency-compatible network links. This test may be performed before or after the above-described data transfer rate analysis. Typically, the port connectivity analysis is only performed on links having an acceptable data transfer rate. Accordingly, the link between server "Speedera (e)" 114 and computer 42 (which in this example has a link transfer rate of 3.21 kb/second) would typically not be tested. Conversely, if the port connectivity analysis is performed prior to the above-described data transfer rate analysis, only those links that pass the data transfer rate analysis would typically have the port connectivity analysis performed.

As discussed above, a port is typically associated with each media data type. Further and as discussed above, via user interface screen 100, user 12 may define the various media data types to be provided to each server. For the above-stated example, for server Speedera (w) 110 (which in this example has an IP address of 202.160.241.150: port 1755 (i.e., IP address 202.160.241.150:1755) may be accessed for Windows™ media; port 7070 (i.e., IP address 202.160.241.150: 7070) may be accessed for Real™ media; port 1935 (i.e., IP address 202.160.241.150:1935) may be accessed for Flash™ media; and port 554 (i.e., IP address 202.160.241.150:554) may be accessed for Quicktime™ media.

Typically, when performing 210 a port connectivity analysis, link analysis system 10 transmits a standard message to the port being tested. If the port being tested generates an acknowledgement message, the port is deemed available and a positive (i.e., passing) port availability statistic is generated for the port being tested. Alternatively, if the port does not generate an acknowledgement message, the port is deemed unavailable and a negative (i.e., failing) port availability statistic is generated for the port being tested.

As discussed above, the links between computer 42 and server "Speedera (w)" 110, and server "Media.com" 138 each had acceptable data transfer rates. For server "Speedera (w)" 110, port 1755 (i.e., Windows™ media), port 7070 (i.e., Real™ media), port 1935 (i.e., Flash™ media), and port 554 (i.e., Quicktime™ media) may be polled to determine a port availability statistic for each port. Additionally, for server "media.com" 138, port 1755 (i.e., Windows™ media) and port 7070 (i.e., Real™ media) may be polled to determine a port availability statistic for each port. For example, assume that the following port availability statistics are generated:

| Link | Port 1755 | Port 7070 | Port 1935 | Port 554 |
| --- | --- | --- | --- | --- |
| Speedera (w) | Fail | Pass | Pass | Pass |
| Media.com | Pass | Fail | — | — |

The port availability statistics may be stored 218 remotely on data store 50 (FIG. 1) or locally on storage device 46 (FIG. 1).

Figure 4:
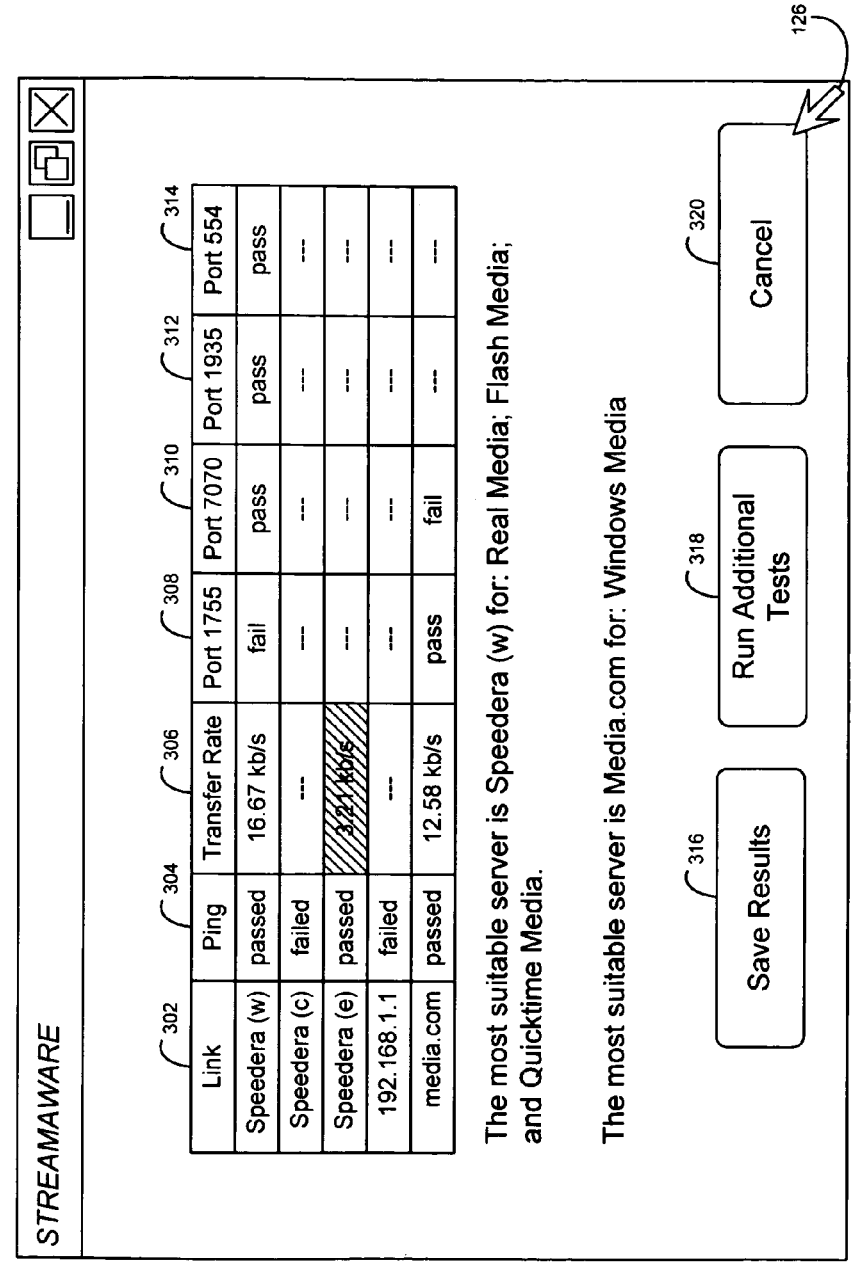
FIG. 4 is a diagrammatic view of a report screen rendered by the link analysis system of FIG. 1.

Referring also to FIG. 4, link analysis system 10 may generate 222 a report screen 300 that summarizes the results of the above-described test. For example, report screen 300 may be tabular in design and include a plurality of columns that define the link name 302, the latency statistics 304 (e.g., as a pass/fail grade or as a latency time); the link data transfer rates 306; and the port availability statistics 308, 310, 312, 314. Additionally, report screen 300 may itemize one or more streaming-compatible network links (i.e., links that would allow for acceptable performance levels when delivering media content to a CDN). In this particular example, the link to server "Speedera (w)" is deemed optimal for delivery of Real Media™, Flash Media™, and Quicktime Media™. Further, the link to server "Media.com" is deemed optimal for delivery of Windows Media™.

User 12 may save report screen 300 by selecting the "Save Results" button 316 using screen pointer 126. Report screen 300 may be saved remotely on data store 50 (FIG. 1) or saved locally on storage device 46 (FIG. 1). Alternatively, user 12 may run additional tests (using the "Run Additional Tests" button 318) or discard the results and close link analysis system 10 (using the "Cancel" button 320).

Referring again to FIG. 3, if 204 a link is deemed to be latency-incompatible, link analysis system 10 may perform 220 a network route analysis to determine one or more specific devices/link portions within the latency-incompatible link that are contributing to the excessive latency of the link. Typically, when performing 220 the network route analysis, a trace route test may be performed to discern the contribution of each device/link portion to the overall latency of the latency-incompatible link. For example, when performing a network route analysis for server "Speedera (c)" 112, IP address 202.160.241.151 may be analyzed, resulting in the generation of the following data Tracing route to 202.160.241.151 over a maximum of 30 hops

| | | | | |
| --- | --- | --- | --- | --- |
| 1 | <1 ms | <1 ms | <1 ms | 192.168.1.1 |
| 2 | 5 ms | 5 ms | 5 ms | 216.177.11.225 |
| 3 | 6 ms | 5 ms | 5 ms | ge-6-1.manchester0-4.nh.G4.net [216.177.5.53] |
| 4 | 6 ms | 5 ms | 5 ms | fe-2-3.manchester0-2.nh.G4.net [216.177.5.161] |
| 5 | 8 ms | 7 ms | 7 ms | link75-129.cent.net [199.232.75.129] |
| 6 | 13 ms | 13 ms | 13 ms | ge-0-0-0.br1.nyc1.ny.gnaps.net [199.232.44.2] |
| 7 | 86 ms | 85 ms | 85 ms | at-1-0-0.br1.lax1.ca.gnaps.net [199.232.44.10] |
| 8 | 262 ms | 276 ms | 261 ms | p1-0.sngtp-cr2.ix.singtel.com [203.208.172.129] |
| 9 | 278 ms | 279 ms | 272 ms | 202.160.243.140 |
| 10 | 267 ms | 273 ms | 278 ms | 202.160.243.140 |
| 11 | 267 ms | 269 ms | 273 ms | 202.160.241.151 |

Trace complete.

By examination of the above-described trace route data, user 12 may be able to determine that steps (i.e., hops) 7-11 contribute significantly to the overall latency of the latency-incompatible link. If the devices defined within these line items are local devices (i.e., devices located within or controllable by site 20), user 12 may be able to effectuate corrective measures (e.g., replacing a defective switch or a noisy patch cable) that result in the link becoming latency-compatible.

While system 10 is described above as verifying the integrity and sufficiency of network links between one or more CDNs and site 20, system 10 may also analyze the integrity and sufficiency of network links between a single server and site 20.

While site 20 is described above as being the site from which media content is broadcast to one or more CDNs, and system 10 is described above as verifying the integrity and sufficiency of network links between the one or more CDNs and site 20, other configurations are possible. For example, site 20 may be the site at which media content is received from one or more CDNs and, therefore, devices 60, 62, 64 may be used to receive and playback media content received from one or more CDNs (as opposed to broadcasting media content to one or more CDNs).

A number of implementations have been described. Nevertheless, it will be understood that various modifications may be made. Accordingly, other implementations are within the scope of the following claims.

What is claimed is:

1. A method comprising:
    performing a latency analysis to determine one or more latency statistics for one or more network links within a distributed computing network;
    comparing the one or more latency statistics to one or more benchmark latency criteria to determine if at least one of the network links is a latency-compatible network link;
    if at least one of the network links is a latency-compatible network link, performing at least one additional network analysis on at least one of the latency-compatible network links to determine whether each of a plurality of logical servers are accessible through a respective port and to determine a data transfer rate statistic for the respective port; and
    generating a report that comprises at least the data transfer rate statistic for the plurality of respective ports.

2. The method of claim 1 further comprising: storing at least one of the one or more latency statistics on a remote data store accessible via the distributed computing network.

3. The method of claim 1 wherein performing at least one additional network analysis comprises performing a data transfer rate analysis to determine a link data transfer rate for discrete portions of at least one of the latency-compatible network links.

4. The method of claim 3 further comprising performing a network route analysis to determine one or more link portion contributions to the link latency statistics.

5. The method of claim 1 wherein said latency analysis comprises determining a latency for a plurality of different portions of the network link within the distributed computing network, and reporting a respective contribution of at least one respective portion to the latency statistics.

6. The method of claim 1 further comprising:
    storing the link data transfer rate on a remote data store accessible via the distributed computing network.

7. The method of claim 1 further comprising modifying at least one network device within the distributed computing network to alter the latency statistics.

8. The method of claim 7 further comprising:
    storing at least one of the one or more port availability statistics on a remote data store accessible via the distributed computing network.

9. The method of claim 1 further comprising:
    if at least one of the network links is a latency-incompatible network link, performing a network route analysis to analyze one or more discrete portions of at least one of the latency incompatible network links; and
    effectuating a corrective measure that results in the network link becoming latency-compatible.

10. The method of claim 9 wherein:
    the one or more benchmark latency criteria comprises an overall maximum allowable latency; and
    the latency-incompatible network link is a network link in which at least one of the one or more latency statistics exceeds a predetermined maximum latency.

11. The method of claim 1 further comprising:
    generating a report that defines one or more streaming-compatible network links for a predetermined data stream, and one or more streaming incompatible links, wherein the one or more streaming-compatible network links are chosen from the one or more network links within a distributed computing network that are latency compatible, have a data transfer rate statistic that exceeds a benchmark data transfer rate criteria, and has accessibility for a respective port associated with the predetermined data stream.

12. The method of claim 11 wherein the report comprises one or more of:
    the one or more latency statistics;
    a link data transfer rate for at least a portion of at least one of the latency-compatible network links; and
    one or more port availability statistics for a data path between a test site on the distributed computing network and one or more data ports within a server device coupled through at least one of the latency-compatible network links.

13. A computer program product residing on a non-transitory computer readable computer readable medium having a plurality of instructions stored thereon which, when executed by a processor, cause that processor to:
    perform a latency analysis to determine one or more latency statistics for one or more network links within a distributed computing network;
    compare the one or more latency statistics to one or more benchmark latency criteria to determine if at least one of the network links is a latency-compatible network link;
    if at least one of the network links is a latency-compatible network link, perform at least one additional network analysis on at least one of the latency-compatible network links to determine whether each of a plurality of logical servers are accessible through a respective port and to determine a data transfer rate statistic for the respective port; and
    generate a report that comprises at least the data transfer rate statistic for the plurality of respective ports.

14. The computer program product of claim 13 further comprising instructions for:
    storing at least one of the one or more latency statistics on a remote data store accessible via the distributed computing network.

15. The computer program product of claim 13 wherein the instructions for performing at least one additional network analysis comprise instructions for:

performing a data transfer rate analysis to determine a link data transfer rate for discrete portions of at least one of the latency-compatible network links.

16. The computer program product of claim 15 wherein the instructions for performing a data transfer rate analysis comprise instructions for performing a network route analysis to determine one or more link portion contributions to the link latency statistics.

17. The computer program product of claim 15 further comprising instructions for:
comparing the link data transfer rate for a selected portion of the distributed computing network to a benchmark data transfer rate to determine if the selected portion of at least one of the latency-compatible network links has an acceptable data transfer rate.

18. The computer program product of claim 13 further comprising instructions for:
storing the link data transfer rate on a remote data store accessible via the distributed computing network.

19. The computer program product of claim 13 wherein the instructions for performing at least one additional network analysis comprise instructions for:
performing a port connectivity analysis to determine port availability statistics for a plurality of data ports within a server device coupled to at least one of the latency compatible network links.

20. The computer program product of claim 19 further comprising instructions for:
storing at least one of the one or more port availability statistics on a remote data store accessible via the distributed computing network.

21. The computer program product of claim 13 further comprising instructions for:
if at least one of the network links is a latency-incompatible network link, performing a network route analysis to analyze one or more discrete portions of at least one of the latency incompatible network links.

22. The computer program product of claim 13 further comprising instructions for:
generating a report that defines one or more streaming-compatible network links for a predetermined data stream, and one or more streaming incompatible links, wherein the one or more streaming-compatible network links are chosen from the one or more network links within a distributed computing network that are latency compatible, have a data transfer rate statistic that exceeds a benchmark data transfer rate criteria, and has accessibility for a respective port associated with the predetermined data stream.

23. The computer program product of claim 22 wherein the report comprises one or more of:
the one or more latency statistics;
a link data transfer rate for at least a portion of at least one of the latency-compatible network links; and
one or more port availability statistics for a data path between a test site on the distributed computing network and one or more data ports within a server device coupled through at least one of the latency-compatible network links.

24. An apparatus, comprising:
a network interface to a distributed computing network;
a time base; and
a processor, adapted to:
perform a latency analysis for a communications path between the network interface and a remote server through the distributed computing network, the distributed computing network having a plurality of network links, each network link having an associated latency, to determine one or more latency statistics for the plurality of network links;
compare the determined one or more latency statistics to one or more benchmark latency criteria to determine if at least one network link in the communications path is latency-compatible;
perform at least one additional network analysis only on latency-compatible network links and determine therefrom whether each of a plurality of logical servers coupled to the network link are accessible through a respective port,
determine a data transfer rate statistic for the respective port; and
generate a report comprising at least the data transfer rate statistic for the plurality of respective ports.

25. The apparatus according to claim 24,
wherein the determined one or more latency statistics is compared to one or more benchmark latency criteria to determine if each of a plurality of network links in the communications path are latency-compatible, the processor being further adapted to determine at least that a first of the plurality of network links is latency compatible and a second of the plurality of network links is not latency compatible, the report defining one or more streaming-compatible network links for a predetermined data stream, and one or more streaming incompatible links, wherein the one or more streaming-compatible network links are chosen from the one or more network links within a distributed computing network that are latency compatible, have a data transfer rate statistic that exceeds a benchmark data transfer rate criteria, and has accessibility for a respective port associated with the predetermined data stream,
the report comprising one or more latency statistics; a link data transfer rate for at least a portion of at least one of the latency-compatible network links; and one or more port availability statistics for a data path between a test site on the distributed computing network and one or more data ports within a server device coupled through at least one of the latency-compatible network links; and
wherein the processor is adapted to:
perform a port connectivity analysis to determine port availability statistics for a plurality of data ports within a server device coupled to at least one of the latency compatible communication paths; and
perform an analysis to determine a respective contribution of each link portions within a network link to the latency of the network link and a data transfer rate analysis to determine a link portion data transfer rate for discrete portions of the network link.

26. The apparatus according to claim 24, wherein the processor is further adapted to:
cause an interface screen to be displayed, the interface screen comprising a list of a plurality of remote servers in the distributed network that are available to receive streaming media content and a list of a plurality of streaming media content types that can be uploaded to the respective remote servers, each of the items on the lists being individually selectable;
receive a selection of at least one server in the distributed network and a selection of a plurality of streaming media content types;

identify for the selected server a first port associated with a first logical server that is accessed for a first media content type selected and a second port associated with a second logical server that is accessed for a second media content type selected;

determine that the first of the plurality of network links has an acceptable data transfer rate;

perform the at least one additional network analysis only on network links having the acceptable data transfer rate; and generate a report indicating at least port accessibly for the plurality of respective ports.

* * * * *